US009990139B2

(12) United States Patent
Nadakuditi et al.

(10) Patent No.: US 9,990,139 B2
(45) Date of Patent: Jun. 5, 2018

(54) SCALABLE AND AREA OPTIMIZED METHOD TO IMPLEMENT COMMAND QUEUES IN SRIOV BASED NVM DEVICES

(71) Applicant: SAMSUNG ELECTRONICS CO., LTD., Suwon-si, Gyeonggi-do (KR)

(72) Inventors: Srinivasa Raju Nadakuditi, Karnataka (IN); Madhusudan Sampath, Karnataka (IN); Sarath Kumar Kunnumpurathu Sivan, Kerala (IN)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 212 days.

(21) Appl. No.: 14/987,045

(22) Filed: Jan. 4, 2016

(65) Prior Publication Data
US 2016/0306549 A1    Oct. 20, 2016

(30) Foreign Application Priority Data

Apr. 16, 2015  (IN) .......................... 1966/CHE/2015

(51) Int. Cl.
| G06F 3/00 | (2006.01) |
| G06F 13/12 | (2006.01) |
| G06F 13/38 | (2006.01) |
| G06F 13/20 | (2006.01) |
| G06F 13/00 | (2006.01) |
| G06F 13/28 | (2006.01) |
| G06F 3/06 | (2006.01) |
| G06F 13/42 | (2006.01) |
| G06F 13/40 | (2006.01) |
| G06F 9/455 | (2018.01) |
| H04L 12/24 | (2006.01) |

(52) U.S. Cl.
CPC ............ *G06F 3/061* (2013.01); *G06F 3/0659* (2013.01); *G06F 3/0688* (2013.01); *G06F 9/45558* (2013.01); *G06F 13/4022* (2013.01); *G06F 13/4282* (2013.01); *H04L 41/0654* (2013.01); *H04L 41/0681* (2013.01); *G06F 2009/45579* (2013.01); *G06F 2009/45583* (2013.01); *Y02B 60/1228* (2013.01); *Y02B 60/1235* (2013.01)

(58) Field of Classification Search
CPC .. G06F 3/0607; G06F 3/0659; G06F 12/0246; G06F 3/061; G06F 3/0679; G06F 3/0688; G06F 3/0689; G06F 13/1684; G06F 2212/2022; G06F 2212/7201
USPC ............. 710/9, 5, 72, 74, 313; 711/103, 114
See application file for complete search history.

(56) References Cited

U.S. PATENT DOCUMENTS 7,143,410 B1 * 11/2006 Coffman ................. G06F 9/526
                                                                            718/100
7,457,897 B1 * 11/2008 Lee ...................... G06F 13/1684
                                                                            710/10

(Continued)

*Primary Examiner* — Faisal M Zaman
(74) *Attorney, Agent, or Firm* — F. Chau & Associates, LLC

(57) ABSTRACT

Provided are method for dynamically allocating resources to command queues and response queues by a non-volatile memory (NVM) controller. The method includes creating command queues and response queues for at least one operating system among a plurality of operating systems running on a host system and mapping the created command queues and response queues to a plurality of internal shared queue registers. The plurality of operating systems running on the host system communicate with at least one NVM controller independently.

19 Claims, 7 Drawing Sheets

(56) References Cited

U.S. PATENT DOCUMENTS

| | | | |
|---|---|---|---|
| 7,496,707 B2 * | 2/2009 | Freking | G06F 13/385 |
| | | | 710/310 |
| 7,660,306 B1 * | 2/2010 | Eiriksson | H04L 12/4641 |
| | | | 370/392 |
| 7,991,839 B2 | 8/2011 | Freimuth et al. | |
| 8,196,144 B2 | 6/2012 | Kagan et al. | |
| 8,473,648 B2 | 6/2013 | Chakhaiyar et al. | |
| 8,489,699 B2 | 7/2013 | Goggin et al. | |
| 8,719,843 B2 | 5/2014 | Tamir et al. | |
| 8,799,534 B2 | 8/2014 | Komikado | |
| 9,734,086 B2 * | 8/2017 | Flynn | G06F 12/121 |
| 2004/0010545 A1 * | 1/2004 | Pandya | H04L 29/06 |
| | | | 709/203 |
| 2006/0136654 A1 * | 6/2006 | Franklin | G06F 3/061 |
| | | | 711/103 |
| 2010/0262740 A1 * | 10/2010 | Borchers | G06F 3/0613 |
| | | | 710/263 |
| 2011/0161955 A1 * | 6/2011 | Woller | G06F 9/4406 |
| | | | 718/1 |
| 2013/0024595 A1 | 1/2013 | Subramniyan et al. | |
| 2013/0198450 A1 * | 8/2013 | Malwankar | G06F 3/0607 |
| | | | 711/114 |
| 2013/0254368 A1 * | 9/2013 | Guay | G06F 9/45533 |
| | | | 709/223 |
| 2014/0149985 A1 * | 5/2014 | Takeuchi | G06F 9/45558 |
| | | | 718/1 |
| 2014/0237170 A1 * | 8/2014 | Okita | G06F 12/0246 |
| | | | 711/103 |
| 2014/0310369 A1 * | 10/2014 | Makhervaks | G06F 13/14 |
| | | | 709/207 |
| 2016/0291866 A1 * | 10/2016 | Olcay | G06F 3/061 |

* cited by examiner

SCALABLE AND AREA OPTIMIZED METHOD TO IMPLEMENT COMMAND QUEUES IN SRIOV BASED NVM DEVICES

CROSS-REFERENCE TO RELATED APPLICATION

This application claims priority under 35 U.S.C. § 119 to Indian Patent Application No. 1966/CHE/2015 filed on Apr. 16, 2015 in the Indian Intellectual Property Office, the disclosure of which is incorporated by reference in its entirety herein.

BACKGROUND

1. Technical Field

The present inventive concept relates to non volatile memory (NVM) devices, and Single Root Input/output Virtualization (SR-IOV), and more particularly relates to an NVM device that allows distribution of queue resources supported by the NVM device across virtual and/or physical functions.

2. Discussion of Related Art

To fulfill the increasing requirement of interoperability, lower latency, higher throughput, and lower computation overhead, the Peripheral Component Interconnect (PCI) Special Interest Group (PCI-SIG) introduced a Single Root I/O Virtualization (SR-IOV) specification, which allows a device to appear to be multiple separate physical PCI express (PCIe) devices. The SR-IOV works through physical functions (PF) and virtual functions (VF). The PF's are full PCIe functions that include the SR-IOV extended capability. The capability is used to configure and manage the SR-IOV functionality. The PF includes all of the extended capabilities in the PCIe based specifications. The VFs are "lightweight" functions that contain the resources necessary for data movement but have a carefully minimized set of configuration resources. The SR-IOV may allow each VM to have direct access to hardware, such as a Network Interface Controller (NIC), a Converged Network Adapter (CAN), or a Host Bus Adapter (HBA), using the virtual function.

An NVM controller generally uses multiple command queues for issuing commands to NVM devices and response queues for receiving responses from NVM devices. With the increase in the number of virtual machines supported by a host system, the number of VFs supported by the device is also expected to increase. Due to this, the total number of queues supported by the device would also increase. However, an NVM controller implements a static number of queues since it is inefficient to implement the hardware logic required to implement the increasing number of the command queues and the response queues.

SUMMARY

An embodiment of the present inventive concept provides a controller for an NVM device supporting SR-IOV.

An embodiment of the present inventive concept provides a method to distribute a plurality of internal queue registers for queue processing between multiple operating systems. The number of the queues supported by the NVM device is shared between the operating systems.

At least embodiment of the present inventive concept is designed to reduce the cell area and the power consumption of the NVM device by implementing registers of the plurality of internal shared queue registers based on created command queues and response queues.

According to an exemplary embodiment of the present inventive concept, there is provided a method for dynamically allocating resources to command queues and response queues by a non-volatile memory (NVM) controller, the method including creating command queues and response queues for at least one operating system among a plurality of operating systems running on a host system and mapping said created command queues and response queues to a plurality of internal shared queue registers. The plurality of operating systems running on the host system communicate with at least one NVM controller independently.

According to an exemplary embodiment of the present inventive concept, there is provided an apparatus for dynamically allocating resources to command queues and response queues. The apparatus includes a non-volatile memory (NVM) controller configured for creating command queues and response queues for at least one operating system among a plurality of operating systems running on a host system and mapping the created command queues and response queues to a plurality of internal shared queue registers. The plurality of operating systems running on the host system communicate with at least one NVM controller independently.

According to an exemplary embodiment of the inventive concept, a system is provided that is configured to manage a plurality of virtual machines. The system includes: a host computer having a host operating system, and a hypervisor configured to manage a first virtual machine with a first guest operating system and a first virtual function driver and a second virtual machine with a second guest operating system and a second virtual function driver; a non-volatile memory (NVM), wherein the NVM comprises a controller configured to create queues in a register of the NVM, and map the first virtual function driver and the second virtual function driver to the same queues stored in the register.

BRIEF DESCRIPTION OF THE DRAWINGS

The present inventive concept will become more apparent by describing in detail exemplary embodiments thereof with reference to the attached drawings in which.

DETAILED DESCRIPTION OF THE EXEMPLARY EMBODIMENTS

Figure 1:
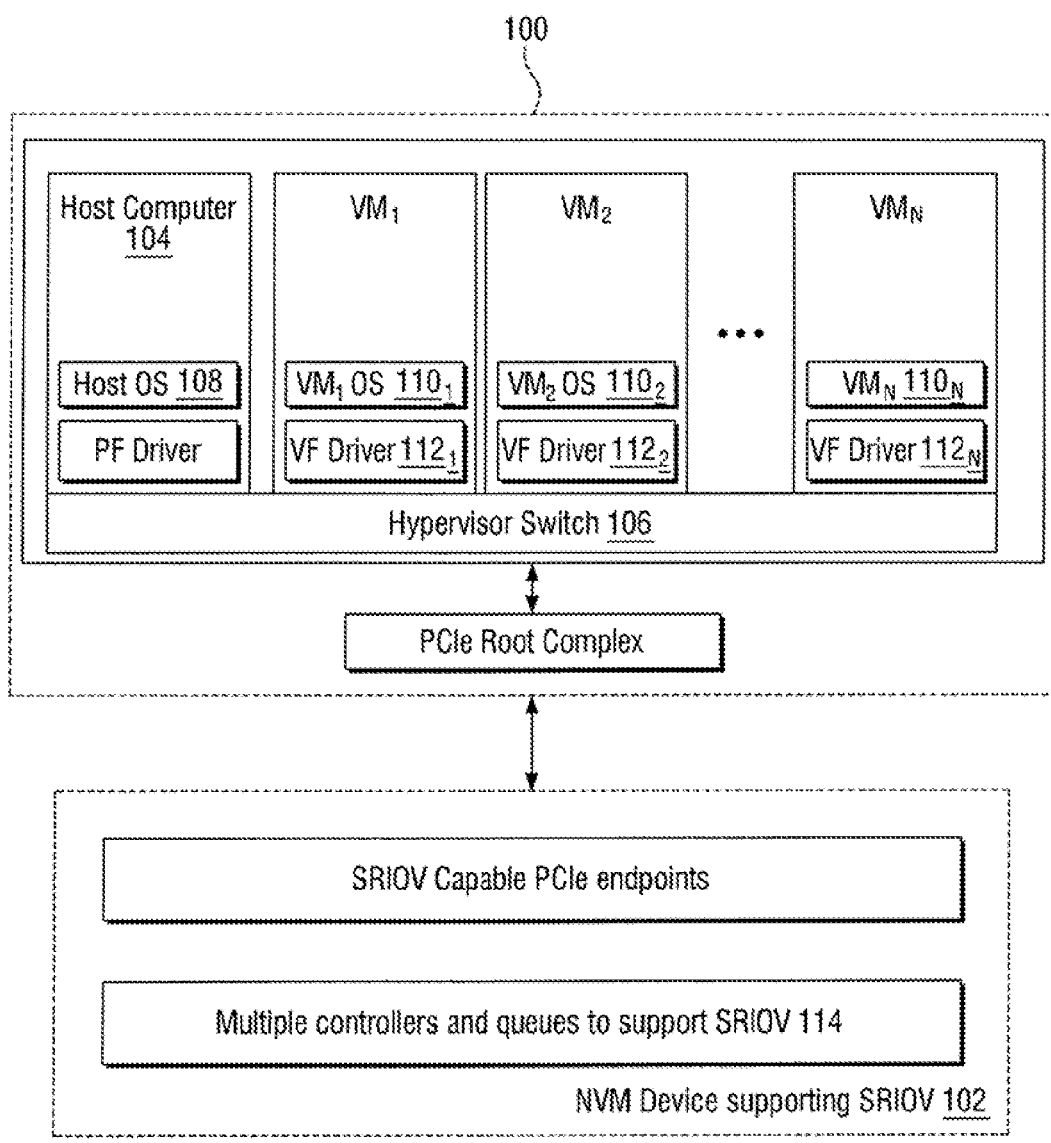
FIG. 1 illustrates a system in which multiple operating systems are communicating with NVM device(s) using an NVM controller, according to exemplary embodiment of the inventive concept.

Exemplary embodiments of the inventive concept will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Unless otherwise noted, like reference numerals denote like elements throughout the attached drawings and written description, and thus descriptions will not be repeated. In the drawings, the sizes and relative sizes of layers and regions may be exaggerated for clarity.

As used herein, the singular forms "a", "an" and "the" are intended to include the plural forms as well, unless the context clearly indicates otherwise. It will be understood that when an element or layer is referred to as being "on", "connected to", "coupled to", or "adjacent to" another element or layer, it can be directly on, connected, coupled, or adjacent to the other element or layer, or intervening elements or layers may be present.

The term "queue" herein refers to a mechanism used commonly by a host system to submit commands to a device for processing. Generally, the command in the queue is executed, either in order of priority, or on a first-in first-out basis, or in any order that serves the purpose.

The terms "command queue" and "submission queue" are used herein interchangeably and refer to commands created by the host and placed in a submission queue.

The terms "response queue" and "completion queue" are used herein interchangeably and is used to signal to the host the executed commands. For example, a result of executing a command (e.g., data) in the command queue may be placed into the response queue, or a notification that a command in the command queue has been executed may be replaced in the response queue.

The embodiments disclosed herein provide a method for dynamically allocating resources to command queues and response queues by a non-volatile memory controller. The method includes creating command queues and response queues for at least one operating system among a plurality of operating systems running on a host system. The plurality of operating systems running on the host system can communicate with at least one NVM controller independently. The method includes mapping the created command queues and response queues to internal shared queue registers in a single internal queue register repository. The command queues and response queues are created using inputs received from physical functions (PF) and virtual functions (VF). The command queues and response queues are created based on a number of queues supported by the internal shared queue register repository of the NVM controller. Further, the command queues and response queues mapped to the internal shared queue registers are implemented by the NVM device.

The proposed method and system is a simple and cost effective way to utilize the NVM device resources in an area optimized manner when the NVM device supports Single Root-Input/output Virtualization SR-IOV. Unlike existing command queue and response queue implementations, where the number of queues supported by the NVM device is implemented using dedicated hardware logic like dedicated registers and dedicated queues, the proposed method allows the NVM device to implement the command queue and response queue based on a usage scenario.

Further, the proposed method allows scalability in terms of the number of queues per function. For example different configuration like VF1-4 Queues, VF2-8 Queues can be used, as the registers implemented for the created command queues and the created response queues may be based on registers sets mapped in the internal shared queue registers.

FIG. 1 illustrates a system 100 in which multiple operating systems are communicating with one or more NVM device(s) 102 capable of supporting SRIOV using at least one NVM controller 114, according to at least one embodiment of the inventive concept. An NVM device 102 may include one or more SRIOV capable PCIe endpoints as illustrated in FIG. 1. FIG. 1 illustrates a system 100 in which a host computer 104 with an operating system 108 supports a plurality of virtual machines (e.g., guest operating systems) using an Hypervisor switch 106. The host computer 104 includes a PF driver for managing and executing full PCIe functions that include the SRIOV capability (e.g., PFs). In an embodiment, the system 100 can be a server system serving multiple systems (using the plurality of virtual machines). The utilization of the NVM device(s) 102 can be maximized by allowing the multiple operating systems (OS) (e.g., the operating systems of the virtual machines) to share a single physical interface. FIG. 1 shows plurality of virtual machines ($VM_1$, $VM_2$ ... $VM_N$) with a plurality of OS(s) ($110_1$, $110_2$, ... $110_N$) communicating with the NVM device (s) 102 using multiple controllers 114 supporting SRIOV. In an exemplary embodiment, the hypervisor switch 106 is configured to manage the plurality of OS(s) ($110_1$, $110_2$, ..., $110_N$) communicating with the NVM device (s) and assign hardware resources of the Host Computer 104 to each OS 110. Each VM has a VF driver ($112_1$, $112_2$, ..., $112_N$), which may be used to load a VF. The VF driver may use transmit descriptors and receive descriptors to communicate with the VF to inform the VF where to copy data to and from the host memory. The controllers 114 are primarily used as a communication interface through a PCIe root complex, and each controller may provide NVM access, control and management functions. The NVM device 102 supporting SRIOV may include multiple controllers and support multiple queues. Details regarding an NVM controller (e.g., $202_0$) are explained in conjunction with FIG. 2. The PCIe root complex may be configured to communicate with the hypervisor switch 106 and/or the NVM device 102.

In an exemplary embodiment, the NVM device(s) 102 are flash memory, such as (NAND) flash, a phase change memory (PCM), solid state drive (SSD), or any other memory that retains data when no power is applied.

Unlike existing SR-IOV based NVM devices where dedicated queues and registers are allocated per VM and per VF, the proposed system allows the queues to be shared in a dynamic manner based on a requirement. The number of VF's and the queues supported by each VF can keep changing based on system requirements. The proposed system and method allows the NVM controller to use the changing system requirement in terms of VF's and queues supported per VF to dynamically allocate and reallocate the created command queues and response queues to the single internal shared registers, based on the number of queues supported by the NVM device.

Figure 2:
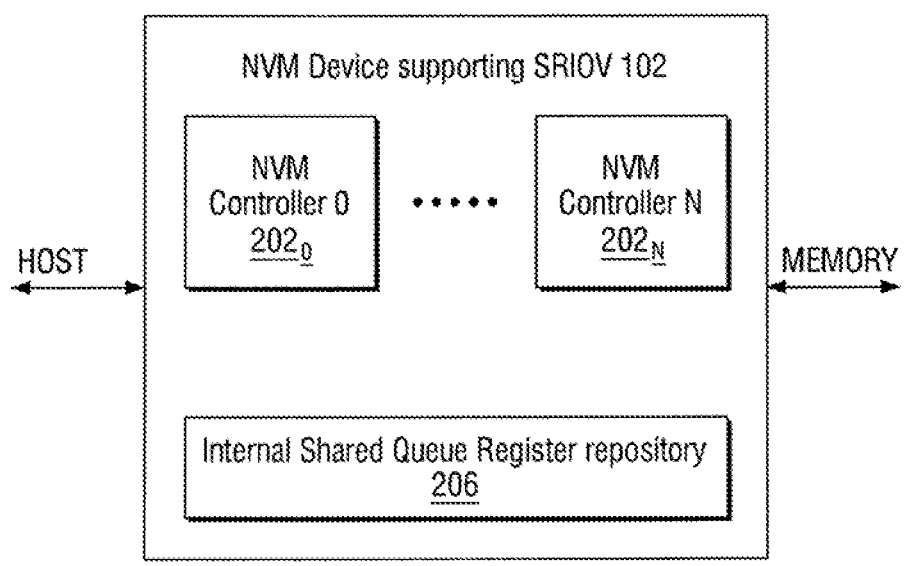
FIG. 2 illustrates a block diagram of the NVM device supporting SRIOV, according to an exemplary embodiment of the inventive concept.

FIG. 2 illustrates a block diagram of the NVM device 102 supporting SRIOV, according to an exemplary embodiment of the inventive concept. The command queues and response queues are created for each virtual machine operating system (e.g., $110_1$, $110_2$, etc.) using a VF driver (e.g., $112_1$). The number of VFs and queues supported by each VF driver (e.g., $112_1$) is configurable.

In an embodiment, the number of VFs or VF drivers for each virtual machine OS (e.g., $110_1$) is configured by the Hypervisor Switch 106. In an embodiment, the Hypervisor Switch 106 is a Virtual Machine Monitor (VMM).

The NVM device 102 may include multiple NVM controllers $202_{(0-N)}$ configured to communicate between the host system 100 and the NVM device 102.

In an embodiment, the NVM controller (e.g., $202_0$) is configured to include an internal shared queue register repository 206. The NVM controller (e.g., $202_0$) can be configured to map the created command queues and response queues to the internal shared queue register repository 206 for each virtual machine operating system (e.g., $110_1$, $110_2$, etc.). Registers sets in the internal shared queue register repository 206 are distributed among the command queues and response queues created from the virtual machine operating systems (e.g., $110_1$, $110_2$, etc.) based on inputs from the VF drivers (e.g., $112_1$, $112_2$, etc.). A NVM controller (e.g., $202_0$) can be configured to execute the commands in the command queues. A queue manager module can be configured to scale the maximum number of queues supported per VF driver (e.g., $112_1$) based on the number of queues supported by the NVM device 102.

Figure 3:
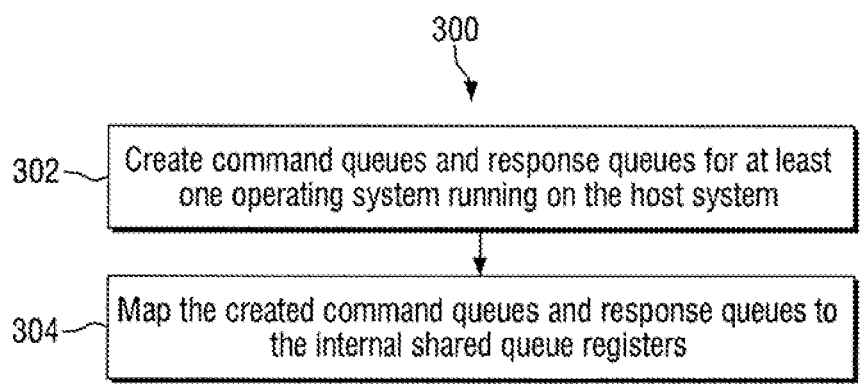
FIG. 3 is a flow diagram illustrating a method of dynamically allocating resources by the NVM controller, according to an exemplary embodiment of the inventive concept.

FIG. 3 is a flow diagram illustrating a method 300 of dynamically allocating resources by an NVM controller (e.g., $202_0$), according to an exemplary embodiment of the inventive concept. The various steps of the method 300 are summarized into individual blocks where some of the steps can be performed by various modules of the NVM device 102, the NVM controllers (e.g., $202_0$-$202_N$), or the host computer 104. The method 300 and other descriptions described herein provide a basis for a control program, which can be implemented using a microcontroller, a microprocessor, or an equivalent thereof. An NVM controller may be implemented by a microcontroller, a microprocessor, or an equivalent thereof.

The method 300 includes creating command queues and response queues for at least one virtual machine operating system (e.g., $110_1$, $110_2$, etc.) among a plurality of virtual machine operating systems (e.g., $110_1$-$110_N$) running on a host system 100 (S302). The NVM controller (e.g., $202_0$) receives commands from the virtual machine operating systems using the VF drivers (e.g., $112_1$, $112_2$, etc.). The NVM controller (e.g., $202_0$) can be configured to implement a command queue tail pointer and a response queue head pointer as per the advertised NVM device 102. In an embodiment, the command queue tail pointer points to the end of a command queue. In an embodiment, the response queue head pointer points to the beginning of a response queue.

When the NVM device 102 includes multiple NVM controllers 114 associated with multiple hosts, the tail and head pointers of the queues from each host may be accessible to the respective host in a specific address or specific order/priority. The queue parameters are programmed by the host computer 104. In an embodiment, the number of queues received from the host computer 104 does not exceed the number of queues supported by the NVM device 102.

The method 300 includes mapping the created command queues and response queues to the internal shared queue registers (S304). The created command queues and response queues are mapped to the internal shared queue register repository 206. Each queue created by the host system 100 can be mapped to the internal shared queue registers in the internal shared queue register repository 206.

The various actions, acts, blocks, steps, and the like in method 300 may be performed in the order presented, in a different order or simultaneously. Further, in some embodiments, some actions, acts, blocks, steps, and the like may be omitted, added, modified, skipped, and the like without departing from the scope of the present inventive concept.

Figure 4:
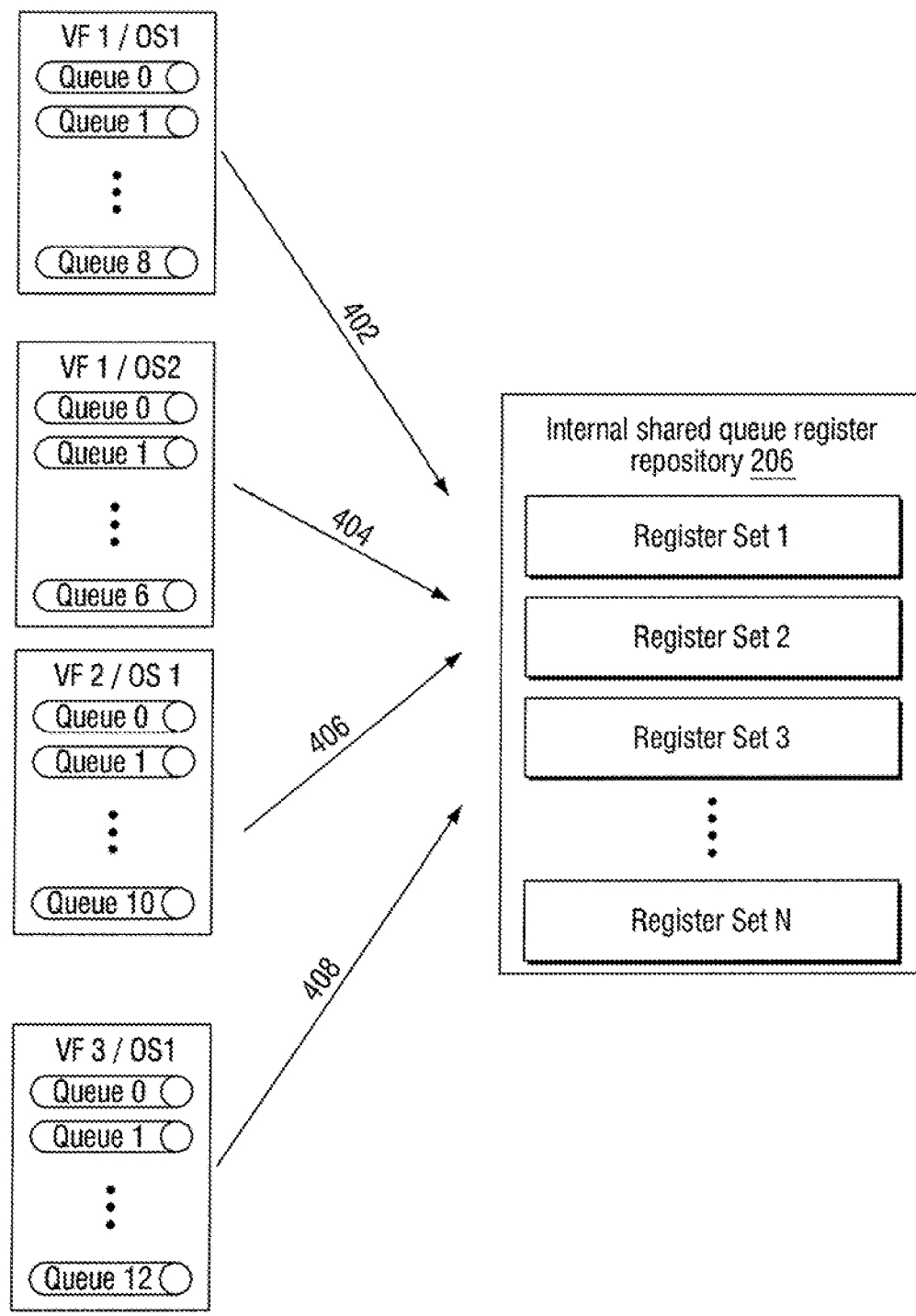
FIG. 4 is an example illustration depicting the sharing of an internal shared queue register repository by queues created for virtual functions supported by each operating system, according to an exemplary embodiment of the inventive concept.

FIG. 4 is an example illustration depicting the distribution of the internal shared queue register repository 206 by the created queues for the VF drivers (e.g., $112_1$-$112_N$) supported by each virtual machine OS (e.g., $110_1$-$110_N$), according to exemplary embodiments of the inventive concept. FIG. 4 shows queues received from the VF drivers (e.g., $112_1$-$112_N$) of different virtual machine OSs (e.g., $110_1$-$110_N$) supported by the system 100. At the internal shared queue register repository 206, the queues received from the virtual machine OSs (e.g., $110_1$-$110_N$) using the VF drivers (e.g., $112_1$-$112_N$) are stored in the register sets in the order received. Each queue may be referenced using a queue identifier QID as per the NVMe specification. When the NVM controller (e.g., $202_0$) receives inputs from a first virtual function VF1 of OS1, it maps the internal register set 1 for the queues created for VF1 of OS. The arrow labeled 402 is an example of this mapping. When the NVM controller (e.g., $202_0$) receives inputs from a first virtual function VF1 of OS2, it maps the internal register set 2 for the queues created for the VF1 of OS2. The arrow labeled 404 is an example of this mapping. When the NVM controller (e.g., $202_0$) receives inputs from a second virtual function VF2 of OS1, it maps the internal register set 2 for the queues created for VF2 of OS1. The arrow labeled 406 is an example of this mapping. When the NVM controller (e.g., $202_0$) receives inputs from a third virtual function VF3 of OS1, it maps the internal register set 3 for the queues created for VF3 of OS1. The arrow labeled 408 is an example of this mapping.

Based on the number of created queues, and the number of registers sets used in the internal shared queue register repository 206, the NVM device 102 implements the hardware logic for the command queues and response queues in the internal shared queue register repository 206. Hence, the resources in terms of gate count and the power consumption used for queue implementation in the NVM device 102 can be reduced, unlike existing mechanisms where a fixed number of registers are implemented for queues from each VF driver.

Figure 5:
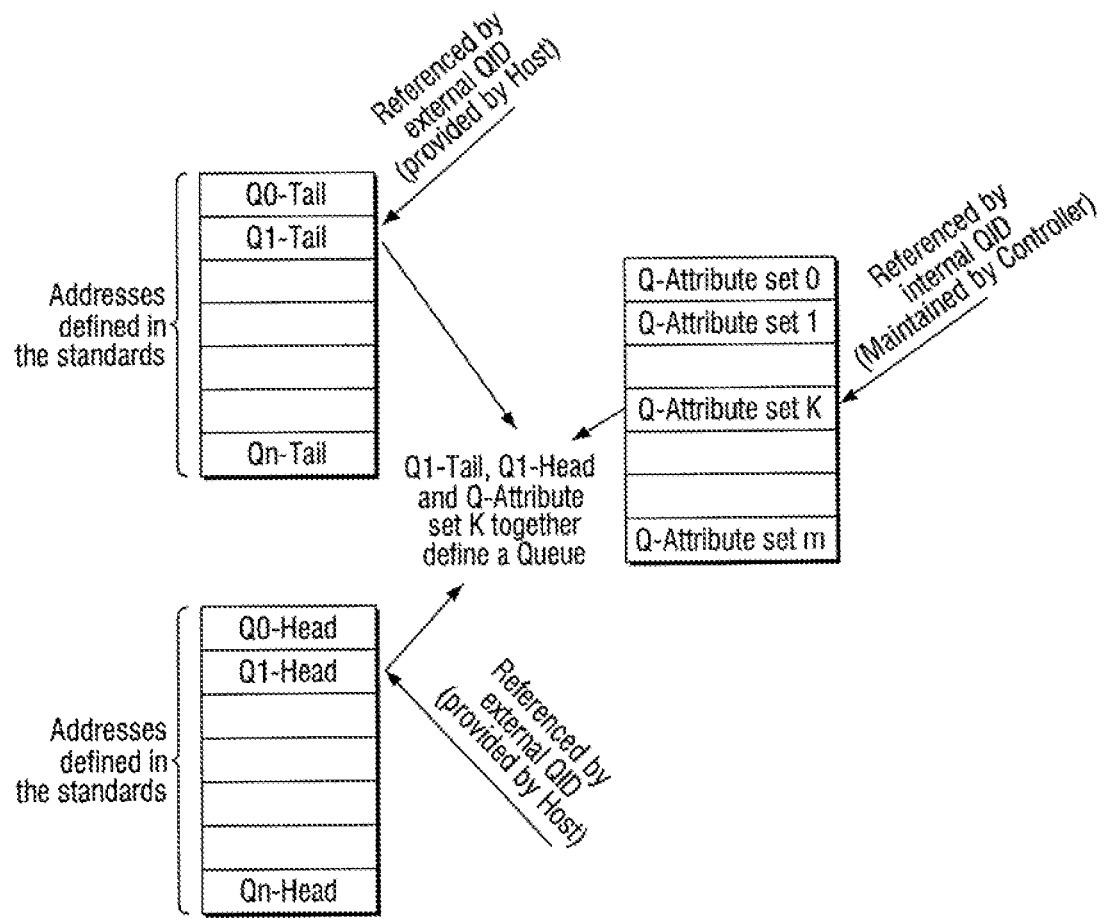
FIG. 5 is an example illustration depicting a mapping of created command queues and response queues to internal shared queue registers, according to an exemplary embodiment of the inventive concept.

As shown in FIG. 5, the tail and head pointers of the queues are indexed by the QueueID intended by the host. The other attributes are indexed by the internal QueueID assigned by the controller. This way, the proposed method reduces the hardware resources needed to support a varying number of queues per controller.

Figure 6A:
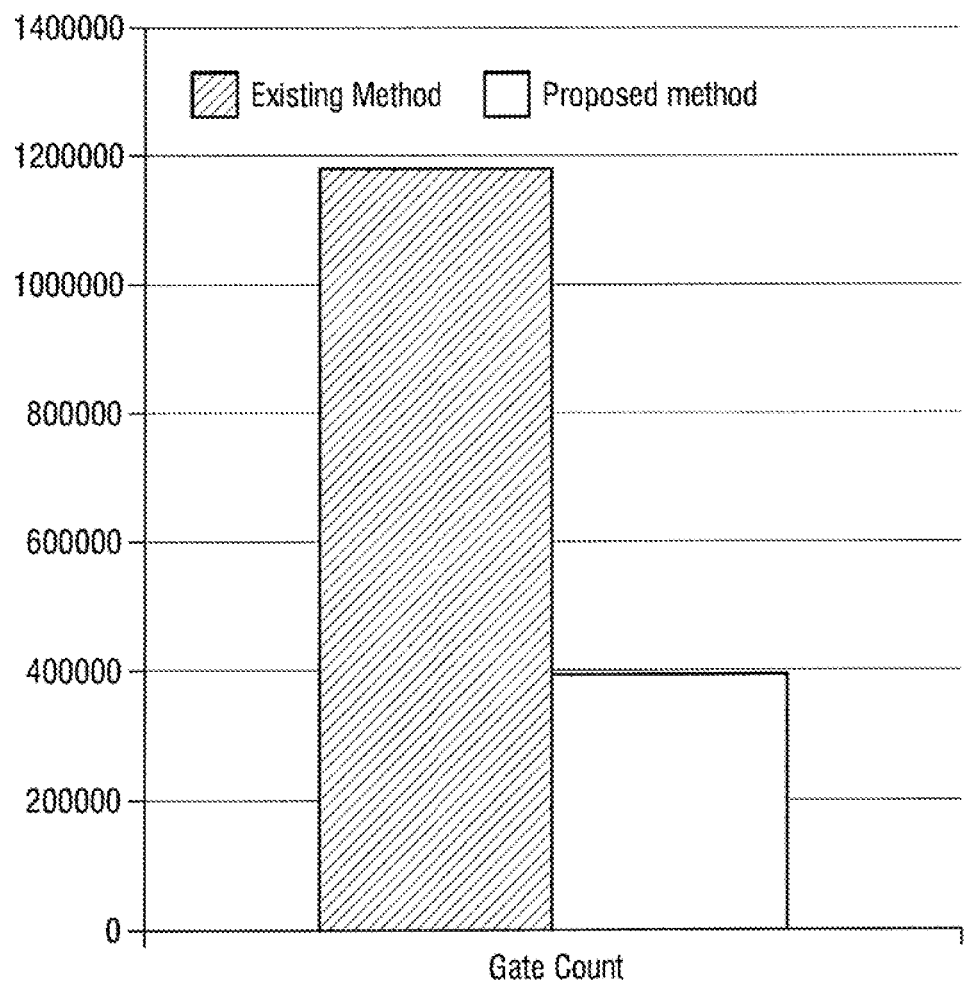
FIGS. 6A and 6B are example graphs showing a reduction in the number of gates used with respect to the number of command queues and response queues, according to embodiments of the inventive concept.
Figure 6B:
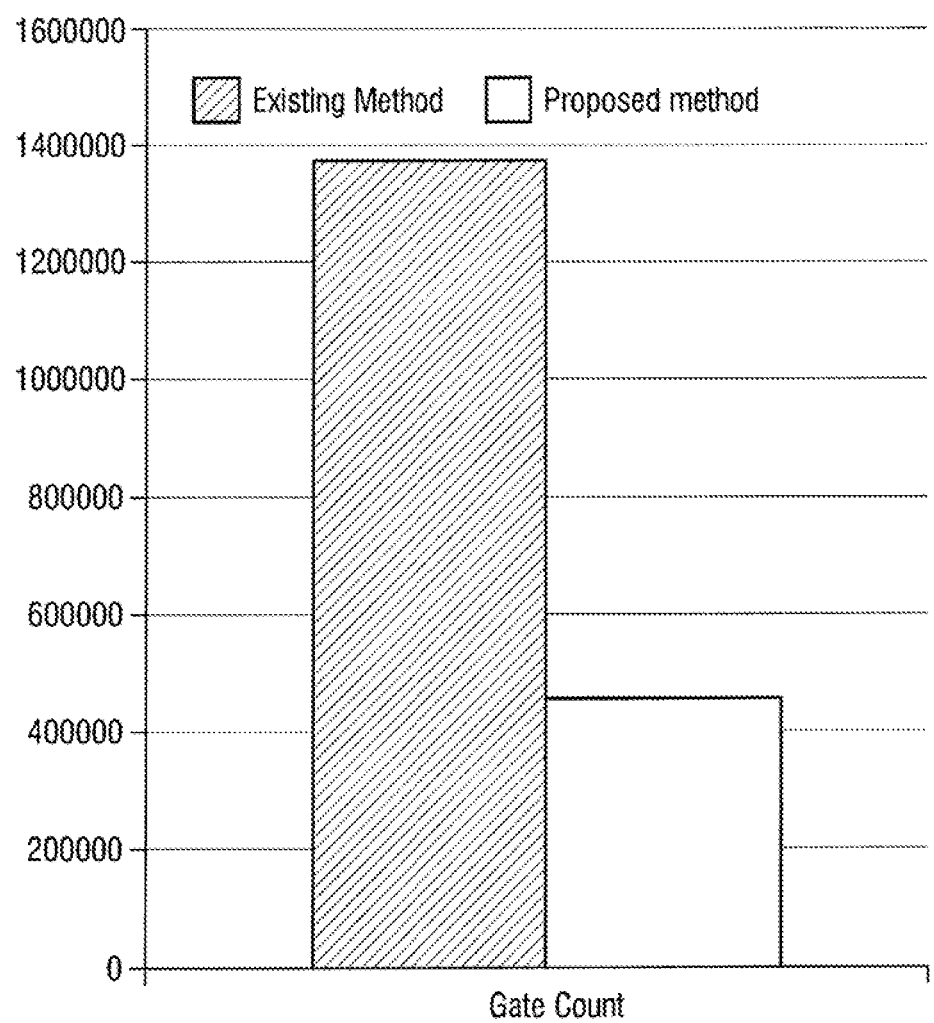

FIGS. 6A and 6B are example graphs showing reduction in the number of gates used with respect to the number of command queues and response queues, according to embodiments of the inventive concept. FIGS. 6A and 6B show the number of gates required for implementing the command queues and response queues in the NVM device 102 using the existing methods and the proposed method.

For FIG. 6A and FIG. 6B, the NVM device configuration settings for command queues and response queues include: 2 Ports, 2 PFs (e.g., 1 per Port), 16 VFs per PF, 128 IO Command queues per PF and 16 IO queues per VF. It is assumed that a 1 bit register requires 8 gates.

A Command Queue implementation using the existing method has 128 total Queues (e.g., 128*2+(16*16)*2=768 gates), 192 register bits per queue, 768 registers (e.g., 768*192=147456 gates), thereby resulting in 1,179,648 total gates (e.g., 147456*8=1,179,648).

A Command Queue implementation using the proposed method uses 256 Total Queues, 192 register bits per queue, 49152 total registers (e.g., 256*192=49152), thereby resulting in 393,216 total gates.

Hence, the saving in terms of hardware logic required implementing the command queues using the proposed system and method is about 66.6% in comparison to existing technique as shown in FIG. 6A.

A Response Queue implementation using the existing method uses 768 Total Queues (e.g., 128*2+(16*16) *2=768), 224 register bits per queue, 172032 Total registers (e.g., 768*224=172032), thereby resulting in 1,376,648 Total gates (e.g., 172032*8=1,376,648).

A Response Queue implementation using the proposed method uses 256 Total Queues, 224 register bits per queue, 57344 Total registers (e.g., 256*224=57344), thereby resulting in 458,758 Total gates (e.g., 57344*8=458,752).

Hence, the saving in terms of hardware logic required for implementing the response queues using the proposed system and method is about 66.6% in comparison to existing technique.

According to an exemplary embodiment of the inventive concept, a system is provided that is configured to manage a plurality of virtual machines (e.g., see the system depicted in FIG. 1). The system includes: a host computer having a host operating system 108 and a hypervisor (e.g., 106), and NVM (e.g., 102). While the box labeled 104 in FIG. 1 is illustrated as a host computer, in this embodiment, the box including elements 104, the virtual machines, and the hypervisor 106 may be referred to as the entire host computer. The hypervisor is configured to manage a first virtual machine (e.g., $VM_1$) with a first guest operating system (e.g., $110_1$) and a first virtual function driver (e.g., $112_1$) and a second virtual machine (e.g., $VM_2$) with a second guest operating system (e.g., $110_2$) and a second virtual function driver ($112_2$); a non-volatile memory (NVM) (e.g., 102). The NVM includes a controller (e.g., $202_0$) configured to create queues in a register (e.g., 206) of the NVM, and map the first virtual function driver and the second virtual function driver to the same queues stored in the register. For example, as shown in FIGS. 4, 404 and 406 may represent a mapping of the first virtual driver $112_1$ and the second virtual driver $112_2$ to a same section of the shared queue register repository 206. For example, queues may have been created in the second register set 2 by an NVM controller in response to a request from the first virtual driver $112_1$, and rather than create new queues in response to a request from the second virtual driver $112_2$, the NVM controller can map the second virtual driver $112_2$ to the same queues created in the second register set 2 so that the second virtual driver $112_2$ can share the same queues.

The embodiments disclosed herein can be implemented through at least one software program running on at least one hardware device and performing network management functions to control the elements. The elements shown in FIGS. 1 and 2 include blocks which can be at least one of a hardware device, or a combination of hardware device and a software module.

While the present inventive concept has been particularly shown and described with reference to exemplary embodiments thereof, it will be understood by those of ordinary skill in the art that various changes in form and details may be made therein without departing from the spirit and scope of the present inventive concept.

What is claimed is:

1. A method for dynamically allocating resources to command queues and response queues by a non-volatile memory (NVM) controller, the method comprising:
mapping, by the NVM controller, first input queues associated with a first operating system (OS) running on a host system to first registers of an NVM device for creating first command queues and first response queues; and
mapping, by the NVM controller, second input queues associated with a second OS running on the same host system to the same first registers so that the second OS shares the created first command queues and first response queues,
wherein the operating systems running on the host system communicate with at least one NVM controller independently.

2. The method of claim 1, wherein the first command queues and first response queues are created using inputs from one of: at least one physical function (PF) and at least one virtual function (VF) that a Single Root I/O Virtualization (SRIOV) specification.

3. The method of claim 1, wherein the mapping of the second input queues occurs when creating additional command and response queues based on the second input queues exceeds a number of queues supported by the NVM device.

4. The method of claim 3, wherein the NVM controller is located within the NVM device.

5. The method of claim 1, wherein each operating system is managed by a different virtual machine running on the host system.

6. An apparatus for dynamically allocating resources to command queues and response queues, the apparatus comprising:
a non-volatile memory (NVM) controller configured to map first input queues associated with a first operating system (OS) running on a host system to first registers of a NVM device to create first command queues and first response queues, and map second input queues associated with a second OS running on the same host system to the same first registers so that the second OS shares the created first command queues and first response queues,
wherein the operating systems running on the host system communicate with at least one NVM controller independently.

7. The NVM controller of claim 6, wherein the first command queues and first response queues are created using inputs from one of: at least one physical function (PF) and at least one virtual function (VF) that support a Single Root I/O Virtualization (SRIOV) specification.

8. The NVM controller of claim 6, wherein the mapping of the second input queues occurs when creating additional command and response queues based on the second input queues exceeds a number of queues supported by the NVM device.

9. The NVM controller of claim 8, wherein the NVM controller is located within the NVM device.

10. The NVM controller of claim 6, wherein each operating system is managed by a different virtual machine running on the host system.

11. A system configured to manage a plurality of virtual machines, the system comprising:
a host computer comprising a host operating system, and a hypervisor configured to manage a first virtual machine comprising a first guest operating system and a first virtual function driver and a second virtual machine comprising a second guest operating system and a second virtual function driver;
a non-volatile memory (NVM),
wherein the NVM comprises a controller configured to create first queues using a plurality of registers of the NVM, and map the first virtual function driver and the second virtual function driver to the same first queues stored in the plurality of registers when creation of additional queues for the second quest operating system exceeds a number of queues supported by the NVM.

12. The system of claim 11, wherein the NVM is configured to support a Single Root I/O Virtualization (SRIOV) specification.

13. The system of claim 11, the first queues comprise at least one command queue configured to store a command to be executed by one of the guest operating systems and a response queue configured to store a result of executing the command.

14. The system of claim 11, wherein the first queues are created using an input from a virtual function of one of the virtual function drivers that is compatible with a Single Root I/O Virtualization (SRIOV) specification.

15. The system of claim 14, wherein one of the virtual function drivers uses descriptors to communicate with the virtual function to inform the virtual function where to copy data to and from a host memory of the host computer.

16. The system of claim 11, wherein the first queues are created using an input from a physical function of a physical function driver of the host computer that is compatible with a Single Root I/O Virtualization (SRIOV) specification.

17. The system of claim 11, further comprising a PCIe root complex configured to interface with the hypervisor and the NVM.

18. The method of claim 3, further comprising:
mapping, by the NVM controller, the second input queues associated with the second OS to second registers of the NVM device for creating second command queues and second response queues when creating additional command and response queues based on the second input queues does not exceed the number of queues supported by the NVM device.

19. The apparatus of claim 6, wherein the NVM controller maps the second input queues associated with the second OS to second registers of the NVM device for creating second command queues and second response queues when creating additional command and response queues based on the second input queues does not exceed a number of queues supported by the NVM device.

* * * * *